United States Patent [19]

Sadre-Marandi et al.

[11] Patent Number: 4,659,202

[45] Date of Patent: Apr. 21, 1987

[54] MIRROR MOUNTING AND DRIVE SYSTEM FOR SLR CAMERAS

[75] Inventors: Ehsan Sadre-Marandi, Chattanooga; Anthony G. Fox, Signal Mountain, both of Tenn.

[73] Assignee: Beattie Systems, Inc., Cleveland, Tenn.

[21] Appl. No.: 808,525

[22] Filed: Dec. 12, 1985

[51] Int. Cl.[4] .......................... G03B 9/12; G03B 13/02
[52] U.S. Cl. ...................................... 354/152; 354/155
[58] Field of Search ................ 354/152, 154, 155, 156

[56] References Cited

U.S. PATENT DOCUMENTS

| | | | |
|---|---|---|---|
| 3,008,397 | 11/1961 | Winkler | 354/156 |
| 3,785,270 | 1/1974 | Schiff et al. | 354/156 |
| 3,911,454 | 10/1975 | Ohmori | 354/154 |

Primary Examiner—A. A. Mathews
Attorney, Agent, or Firm—Alan Ruderman

[57] ABSTRACT

A reflex camera has a mirror mounted at a fixed angle for receiving image rays from a lens and reflecting the rays onto a focusing screen, the mirror and focusing screen being mounted on a slide plate moveable out of the path between the lens and the shutter of the camera. The slide plate is supported by linear bearings for movement along guide rods in a linear path. A motor may be actuated to rotate a cam which drives a pulley wheel during a portion of the cycle of the cam, and which releases the pulley wheel during the remainder of the cycle. The pulley wheel is operatively connected to the slide plate and when the pulley wheel is driven by the cam the slide plate is pulled against the opposition of springs into the focusing position of the camera. When the pulley wheel is released by the cam the springs rapidly propel the slide plate to the picture taking position. The cam and the pulley wheel are mounted for rotation about axes offset from one another and the cam engages a follower on the pulley wheel during part of the cycle and releases the follower during the remainder of the cycle. The cam also controls a switch which energizes and deenergizes the motor.

18 Claims, 5 Drawing Figures

MIRROR MOUNTING AND DRIVE SYSTEM FOR SLR CAMERAS

BACKGROUND OF THE INVENTION

This invention relates to cameras and more particularly to the mounting and driving of the reflecting mirror and also the image focusing screen of reflex cameras.

In single lens reflex cameras the image of the subject to be photographed is viewed through the lens on a focusing screen. In such cameras a mirror is disposed between the lens and the shutter, the shutter being in front of the film. When viewing and composing the subject, the mirror is angularly disposed so as to reflect the image received through the lens onto the screen. However, when the shutter is activated the mirror must move out of the path of the light rays to permit the rays to pass through the shutter and onto the film. To this end the mirrors in the prior art are generally mounted to pivotably swing out of the path between the lens and the shutter when the shutter is activated.

In most reflex cameras the aforesaid mirror mounting is satisfactory, although after substantial use problems may develop in the actuation of the mirror or in the alignment of the mirror or the angle at which the mirror is disposed when viewing. However, in professional type long roll cameras, i.e., where there may be 100 or more picture frames on a roll, the number of times the mirror must pivot may create frequent servicing or failures. Obviously, such failures can be costly to a professional photographer. Moreover, in many of these cameras, there is little room for the mirror to pivot if the cameras are not to be excessively bulky. The spacing between the lens and the film is determined by the focusing length of the lens, and this length is generally of such a small size that the space for the shutter and the mirror is extremely limited. Despite these known deficiencies a simple mounting of the mirror for rapid removal from the path of the light rays during shutter actuation has not been developed in the prior art.

SUMMARY OF THE INVENTION

Consequently, it is a primary object of the present invention to provide a mounting and drive construction for a reflective mirror in a reflex camera for moving the mirror in a linear path into and out of a disposition between the lens and the shutter of the camera.

It is another object of the present invention to provide a slide mechanism for moving the mirror of a single lens reflex camera in a linear path, the mechanism being compact to permit such movement within a limited space.

It is a further object of the present invention to provide a slide mechanism for moving the mirror and image focusing screen of a single lens reflex camera together as a unit in a linear path, the mirror being mounted at a fixed angle relative to the screen and moveable into and out of the path between the lens and the shutter of the camera.

It is a still further object of the present invention to provide a slide mechanism for moving the mirror of a single lens reflex camera in a linear path, the mechanism being compact to permit such movement within a limited space, and including a rotatable motor driven in a single direction and means drivingly coupled to the motor for driving the mirror in a first linear direction and uncoupled from the motor to permit the mirror to move in the opposite direction.

Accordingly, the present invention mounts the mirror at a fixed angle at which light rays may be received through the lens and reflected onto the focusing screen, the mirror and focusing screen being fixedly mounted on a slide plate driven linearly relative to the lens and the shutter so that the mirror may be moved from the focusing position in the path of the lens and the shutter to the shutter actuation or picture taking position out of said path and wherein an aperture in the plate is disposed in said path. Linear bearings support the slide plate which moves relative to guide means fixedly supported in the body of the camera. A motor, which when energized rotates continuously in one direction during a full cycle, rotatably drives a cam which carries abutment means for engaging and driving a follower during a portion of the cycle of the motor. The follower is carried on a pulley member having a center of rotation offset relative to the center of rotation of the cam, and when the cam is driven to a certain position the abutment means dissengages from and releases the follower. A tensioned cable is trained about the pulley and is connected to the slide plate which is urged into the shutter actuation position by resilient means, and when the follower is released from the abutment means the slide plate is propelled rapidly to move the mirror out of the path of the shutter, the cable acting to turn the pulley oppositely to the rotation of the motor. The resilient bias is overcome during that portion of the cycle in which the abutment means is engaged with the follower and the pulley is driven or held stationary.

In the preferred form of the invention one or more abutment pins are carried from a face of a cam for engaging a follower block on the face of the pulley. The mirror is held in the reflecting or viewing position when the motor is stationary and an abutment pin engages and holds the follower block so that the pulley is stationary. When the motor is actuated the abutment pin releases the follower block and the pulley freely rotates in the direction opposite to that of the motor as the slide plate rapidly moves to the picture taking position under the action of the thrust of the resilient means. As the motor continues to rotate through one cycle an abutment pin on the cam again engages the follower block and moves it and the pulley to the rest position while the cable pulls the slide plate back to the viewing position against the action of the resilient means.

In the specific form of the invention the cam carries two abutment pins so that the cycle of the motor is one half of a revolution, a microswitch cooperating with means on the cam for controlling the time the motor is energized. The cam may include a pair of notches on the periphery thereof and when the operator of the microswitch enters a notch the motor is deenergized, but when the operator engages the remainder of the cam periphery the motor is energized.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
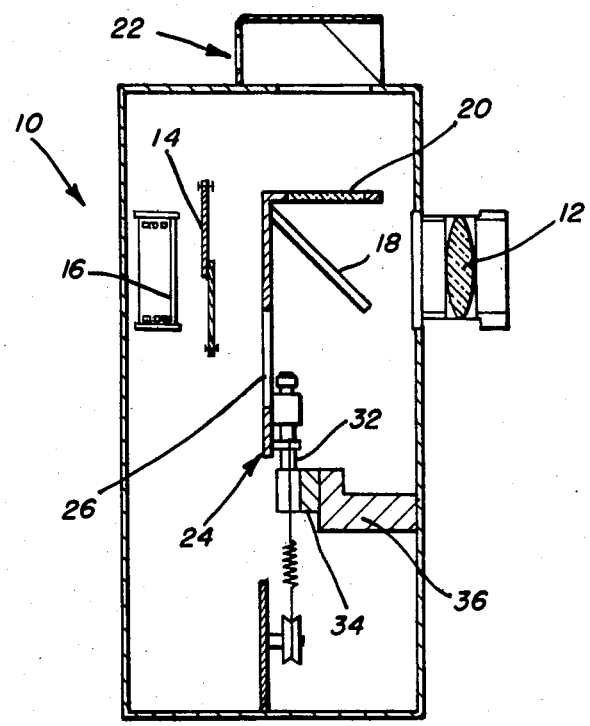
FIG. 1 is a diagrammatic view depicting the general arrangement of a single lens reflex camera incorporating a mirror and focusing screen mounting and drive system constructed in accordance with the principles of the present invention.

Referring to the drawings, the general arrangement of a single lens reflex camera 10 is illustrated in FIG. 1, the camera conventionally having a lens 12, and a shutter 14 between the lens and the film 16. Intermediate the shutter and the lens is a mirror 18 which normally receives the image from the lens and reflects it to an image forming focusing screen 20, the image on the screen 20 being viewed by the photographer through a viewer 22. Consequently, the mirror 18 must move out of the path between the lens and the shutter when the shutter is actuated to photograph a subject. In accordance with the present invention the mirror 18 and the focusing screen are mounted on a common slide plate 24 normally disposed in a lowered position with the mirror intermediate the lens 12 and the shutter 14 as illustrated in FIG. 1, but which is linearly moved to an upper position when the shutter is actuated. The mirror is thereby moved out of the normal path to permit the image forming rays to pass from the lens toward the shutter and the film, the plate 24 having an aperture 26 formed therein below the mirror and disposed in alignment with the lens and shutter when the plate 24 is in the upper position.

Figure 2:
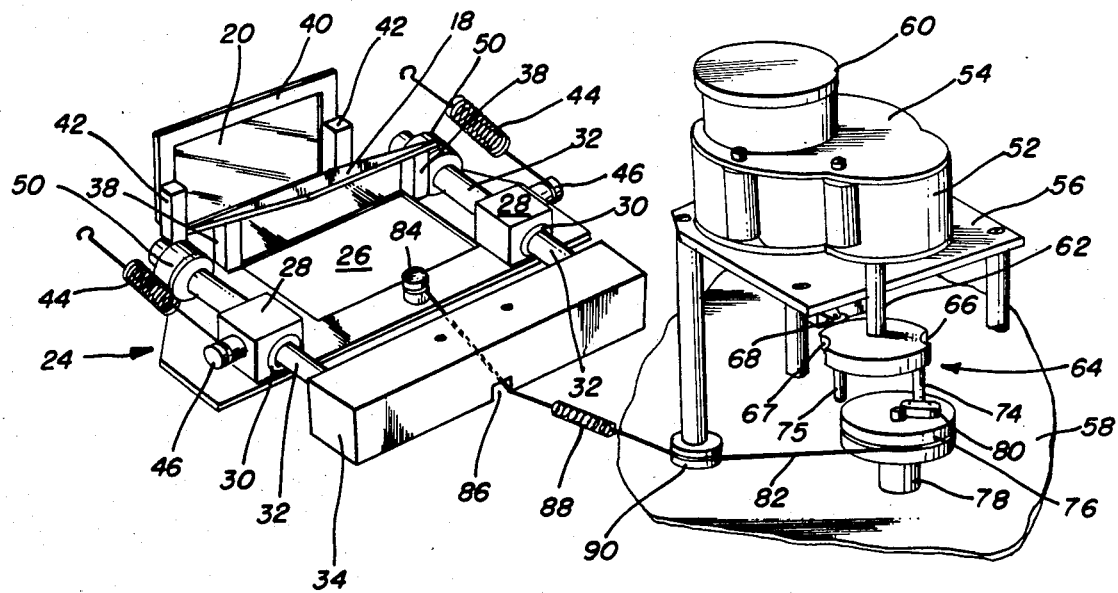
FIG. 2 is a perspective view of the mounting and drive construction illustrated in FIG. 1 but rotated approximately 90° from the normal position.

As illustrated in FIG. 2, the slide plate 24 has a pair of bearing blocks 28 secured thereto in spaced disposition at opposite sides of the aperture 26. Linear bearings 30 are disposed in the respective block 28 and journally receive respective guide rods 32, the rods being disposed parallel to one another. Each guide rod 32 is fixedly secured within a support platform 34 which in turn is securely fastened to the camera housing by means of a bracket 36 or the like secured to the housing. The mirror 18 is secured to support legs 38 which extend from the face of the slide plate 24 above and to the sides of the aperture 26, the legs being such as to secure the mirror at a fixed angle of approximately 45° so as to reflect the image forming rays onto the focusing screen 20. The focusing screen 20 is disposed within a frame 40 fastened to the slide plate 24 by means of support legs 42 extending substantially normally from the plate above the legs 38. With this construction it is clear that the slide plate 24 may slide linearly relative to the platform 34 and hence the lens 12 and the shutter 14. Resilient means in the form of a coil spring 44 having one end attached to a boss 46 extending from each respective bearing block 28 and its opposite end attached to a plate member 48 fixed in the body of the camera acts to urge the slide plate 24 in the upward direction. A stop block 50 is fastened on the respective rod 32 to limit the upper travel of the slide plate to the picture taking position where the aperture 26 is aligned with the lens 12 and shutter 14.

The position of the slide plate is controlled by a drive construction which converts rotary motion of a motor to the linear motion of the slide plate. To this end a conventional low rotational speed motor 52 is mounted in the housing 54 on a plate 56 supported from a wall 58 in the camera. The housing 54 may also carry the electrical controls within a casing 60. Fastened to the motor shaft 62, or a shaft driven by the motor, is a cam 64 having a substantially circular periphery. Formed in the periphery of the cam is at least one and preferably two diametrically opposed notches 66, 67 adapted to receive an operator 68 at the end of an arm 70 of a microswitch 72. When the operator 68 is within a notch 66, 67 the operator arm 70 is urged away from the electrically closed position and the switch is open. When the operator engages the solid remainder of the cam periphery the switch closes to energize the motor.

Extending from a face of the cam 64 at a disposition slightly lagging in phase or angularly rearwardly of a respective notch 66, 67, considered relative to the direction of rotation of the cam, is an abutment member in the form of a pin 74, 75. The pins 74, 75 extend toward a pulley member 76 rotatably mounted on or about an axle 78 extending from the wall 58. The axis of the axle 78 is offset from the axis of the shaft 62 and the pulley carries a follower member in the form of a block 80 disposed on a face thereof and extending from adjacent the axis of the pulley toward the periphery and projecting above the face of the pulley so as to be adapted to engage the pins 74, 75 during a portion of the rotational cycle of the cam for reasons hereinafter described. A cable or cord 82 is fastened at one end to the periphery of the pulley 76 and at its other end to a boss 84 fixed on the slide plate 24 below the aperture 26, the cable passing through a clearance slot 86 formed in the platform 34. A small tension spring 88 attached to the cable in the path between the pulley and the slide plate ensures that the cable is always taut while an idler pulley 90 or the like may be disposed on the wall 58 for guiding the movement of the cable.

Figure 3:
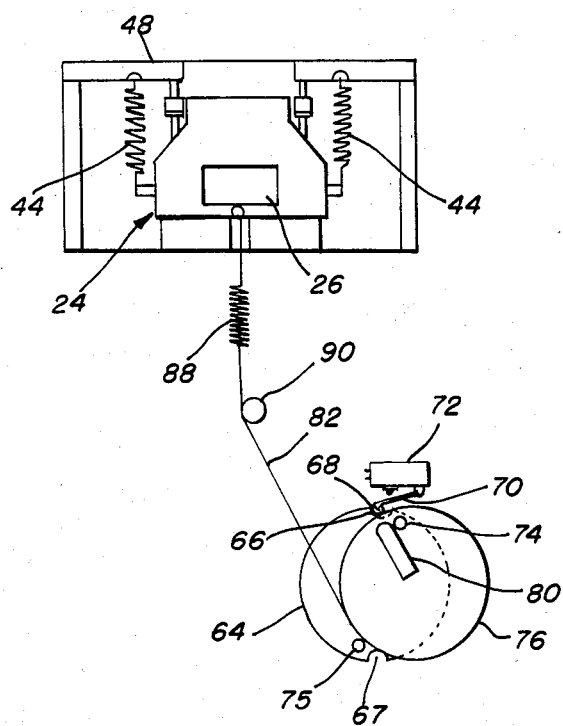
FIG. 3 is a schematic illustration of the operation of the drive construction with the parts in the rest or focusing position.
Figure 4:
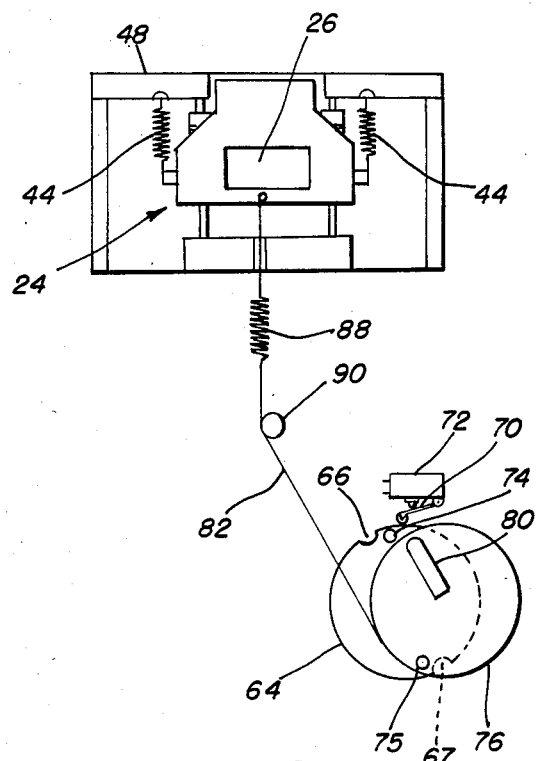
FIG. 4 is a view similar to FIG. 3 but depicted a fraction of the cycle subsequent to actuation of the motor as the mirror is moving toward the picture taking position.
Figure 5:
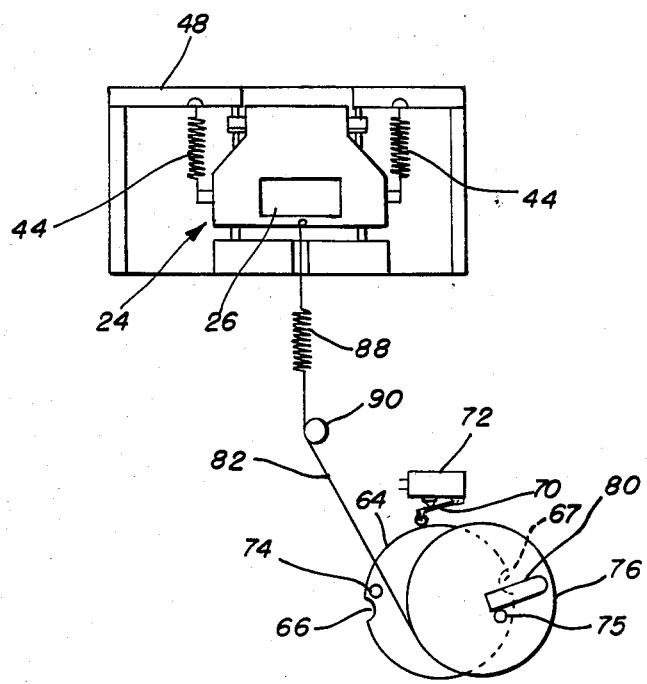
FIG. 5 is a view similar to FIG. 4 at a later instant in the cycle as the mirror is returning toward the focuing position.

As noted above the axis of the shaft 62, which is the center of rotation of the cam 64, is offset relative to the axis of the shaft 78, which is the center of rotation of the pulley 76. This displacement of the respective axes or centers of rotation between the cam 64 and the pulley 76 is best illustrated in FIGS. 3 through 5 by the reference "X" which is related to the radial positions of the abutment pins 74, 75 and the radial length of the follower block 80 such that the follower block is eccentric relative to said cam. Thus, each pin 74, 75 may abut the block during a portion of the rotation of the cam 64 and disengage and release the block after the block has moved to an over-center position where the pin is disposed beyond the radial extent of the block. For example, as illustrated in FIGS. 3 and 5 one pin, e.g., 74, is disposed within the superposed periphery of the pulley 76 and the radial extent of the follower block 80 and thus may abut the follower block to rotate the pulley as the cam 64 rotates. However, in FIG. 4 the cam has rotated such that the pin 74 has moved to a point beyond the superposed periphery of the pulley 76 and the radial extent of the follower block 80 and the pin 74 no longer makes contact with and has released the block. After the point of release, the pulley is rotated in a direction counter to that of the cam 64 by the action of the resilient urging of the cable 82 until the block 80 is engaged by the other pin 75 which has moved to within the superposed periphery of the pulley 76. Of course only one pin 74 or 75 is required, but the cam must then be driven at twice the speed to obtain the same cycle timing. This could be accomplished by utilizing a motor running at twice the speed of a conventional motor 52 or by appropriate gearing between the motor and the cam. Similarly, additional pins may be used to increase the cycle speed without changing the motor.

Thus, the operation of the apparatus may now be described with reference to FIGS. 3 through 5. FIG. 3 depicts the structure in the rest or focusing position wherein the slide plate 24 is in the down position and the mirror 18 is in the path of the light entering the lens 12. At this position the operator 68 of the microswitch 72 is within the notch 66 so that the microswitch is open and the motor is stationary. The pin 74 is in abutment with the follower block 80 at a disposition just prior to the disengagement or release position and the cable 82 is fully trained about the pulley 76 so as to hold the guide plate 24 down and fully stretch the springs 44 to store kinetic energy therein.

When the photographer is ready to take a photo, a conventional switch (not illustrated) is depressed or otherwise triggered. A short electrical starting signal or pulse is transmitted to the motor from the electrical controls to start the motor. The rotation of the motor and the rotation of the cam 64 therewith results in the operator 68 leaving the notch 66 and effects a closing of the microswitch to keep the motor running. As illustrated in FIG. 4, when this occurs, the pin 74 disengages the follower block 80 so that the pulley 78 is free from the cam 64. The kinetic energy stored in the spring 44 is now released and the slide plate 24 is rapidly pulled upwardly to the position where the mirror is removed from the path between the lens 12 and the shutter 14, and the aperture 26 is placed in that path so that when the shutter opens the image rays may pass therethrough. As the slide plate moves upwardly the pulley 78, under the action of the resilient force of the springs, is rapidly rotated in the opposite direction to that in which the motor and the cam are turning and the follower block 80 moves to a position where it may be engaged by the pin 75 as the cam continues to rotate.

As illustrated in FIG. 5, when the pin 75 engages the follower block 80 it drives the pulley 76 in the same rotational direction as the cam 64. This results in the cable 82 pulling the slide plate 24 downwardly against the urging of the springs 44. As the motor, cam and pulley continue to rotate together in the same direction the notch 67 reaches the position where it is entered by the operator 68, thereby opening the switch 72 and shutting the motor. The apparatus is then again in the rest position illustrated in FIG. 3.

With this construction an acurate linearly operated mirror retraction system is provided which utilizes very little space. The angular relationship between the mirror 18 and the focusing screen 20 remains fixed since they are both secured to and move with the slide plate 24. Consequently, misalignment between the mirror and the focusing screen is eliminated.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spririt of the invention are intended to be included within the scope of the appended claims.

Having thus set forth the nature of the invention, what is claimed herein is:

1. Mirror displacing apparatus for moving a mirror in a reflex camera between a focusing position and a picture taking position, said apparatus comprising a reciprocable slide plate moveable between an extended focusing position and a retracted picture taking position, means for mounting said mirror on said slide plate at a fixed angular disposition relative to said plate, resilient means urging the slide plate to its retracted position, power driven cam means selectively operative for forcibly driving the slide plate to its extended position against the opposition of the resilient means and for releasing the slide plate for propelled movement to the retracted position under the trust of the resilient means, said power driven cam means comprising a power drive means, a cam rotatably driven by said power drive means in one direction, and a rotatable load wheel operatively connected to said slide plate, said load wheel having follower means for drivingly coupling said load wheel to said cam for driving the slide plate to said extended position and for uncoupling from said cam for releasing the slide plate for propelled movement to said retracted position.

2. Mirror displacing apparatus as recited in claim 1, wherein said cam and said load wheel have axes of rotation offset from one another, and said follower means is eccentrically mounted on said load wheel relative to the axis of said cam, such that said follower may engage said cam during only a portion of the rotational cycle of said cam.

3. Mirror displacing apparatus as recited in claim 2, including a focusing screen fixedly fastened to said guide plate for receiving reflected images from said mirror while said guide plate is in its extended position.

4. Mirror displacing apparatus as recited in claim 3, wherein said load wheel comprises a pulley, and a cable trained about said pulley and connected to said slide plate, said cable including tension applying means for maintaining said cable taut.

5. Mirror displacing apparatus as recited in claim 1, including mounting means for constraining said slide plate for movement in a linear path, said mounting means comprising a pair of guide rods, means for fixedly fastening said guide rods in substantially parallel spaced apart relationship in said camera, and a linear bearing corresponding to each guide rod fastened to said plate for journally receiving the guide rods.

6. Mirror displacing apparatus as recited in claim 5, wherein said resilient means comprises a pair of springs, means for fastening one end of each of said springs to said slide plate, and means for fixedly fastening the other end of each of said springs in said camera in substantially parallel relationship with said guide rods.

7. Mirror displacing apparatus as recited in claim 6, including stop means for limiting the linear travel of said plate.

8. Mirror displacing apparatus as recited in claim 6, said cam and said load wheel have axes of rotation offset from one another, and said follower means is eccentrically mounted on said load wheel relative to the axis of said cam, such that said follower may engage said cam during only a portion of the rotational cycle of said cam.

9. Mirror displacing apparatus as recited in claim 8, including a focusing screen fixedly fastened to said guide plate for receiving reflected images from said mirror while said guide plate is in its extended position.

10. Mirror displacing apparatus as recited in claim 9, wherein said load wheel comprises a pulley, and a cable trained about said pulley and connected to said slide plate, said cable including tension applying means for maintaining said cable taut.

11. Mirror displacing apparatus as recited in claim 10, wherein said power drive means comprises an electric motor coupled to said cam, an electrical switch means for controlling the actuation of said motor, said switch means including an operator disposed for engagement with said cam, said cam including information means for urging said operator to close said switch means and energize said motor, and for permitting said operator to open said switch and stop said motor.

12. Mirror displacing apparatus as recited in claim 1, wherein said cam comprises a member rotatable about a first axis of rotation, said cam having at least one abutment member, said load wheel being mounted for rotation about a second axis offset from said first axis, said follower means comprises a block disposed for abutting engagement with said abutment member during a portion of the rotational cycle of the cam and for disengagement therefrom during the remainder of the rotational cycle of said cam.

13. Mirror displacing apparatus as recited in claim 12, wherein said load wheel comprises a pulley, and a cable trained about said pulley and connected to said slide plate, said cable including tension applying means for maintaining said cable taut.

14. Mirror displacing apparatus as recited in claim 13, wherein said cam comprises two abutment members disposed on said cam at diametrically opposite positions relative to said first axis, and said follower means comprises a block adapted to be driven by a respective abutment member during consecutive cycles.

15. In a reflex camera having a focusing screen, a lens, a shutter disposed for receiving image rays from said lens, a reflecting mirror normally disposesd between said lens and said shutter in a focusing position for receiving and reflecting image rays from the lens onto said screen and for moving out of the path between said lens and said shutter to a picture taking position for permitting said rays to pass from said lens to said shutter, and means for displacing said mirror between said focusing position and said picture taking position, said means comprising a slide plate, means for mounting said mirror on said slide plate at a fixed angular disposition, means for mounting said slide plate for movement in a linear path between an extended disposition corresponding to said focusing position of said mirror and a retracted disposition corresponding to said picture taking position of said mirror, power drive means for driving said slide plate from the retracted position to the extended position, and resilient means for propelling said slide plate from the extended position to the retracted position, said power drive means comprises a motor, a cam rotatably driven by said motor through a rotational cycle, a rotatable load wheel operatively connected to said slide plate, follower means on said load wheel engageable with said cam during only a portion of the cycle of said cam for rotatably coupling said load wheel with said cam and driving said plate to the extended position and for disengaging from said cam and uncoupling said load wheel from the cam during the remainder of the cycle for permitting the slide plate to be propelled to the retracted position.

16. In a reflex camera as recited in claim 15, wherein said focusing screen is fixedly fastened to said guide plate at a fixed disposition relative to said mirror.

17. In a reflex camera as recited in claim 16, wherein said load wheel comprises a pulley, and a cable trained about said pulley and connected to said slide plate, said cable including tension applying means for maintaining said cable taut.

18. In a reflex camera as recited in claim 17, wherein said cam and said load wheel have axes of rotation offset from one another, and said follower means is eccentrically mounted on said load wheel relative to the axis of said cam, such that said follower may engage said cam during only a portion of the rotational cycle of said cam.

* * * * *